(12) United States Patent
Al-Farraji

(10) Patent No.: US 10,496,377 B1
(45) Date of Patent: Dec. 3, 2019

(54) METHOD AND SYSTEM GENERATING STRING BASED RANDOM PERMUTATION

(71) Applicant: Shakir M. Hussain Al-Farraji, San Francisco, CA (US)

(72) Inventor: Shakir M. Hussain Al-Farraji, San Francisco, CA (US)

( * ) Notice: Subject to any disclaimer, the term of this patent is extended or adjusted under 35 U.S.C. 154(b) by 0 days.

(21) Appl. No.: 16/037,134

(22) Filed: Jul. 17, 2018

(51) Int. Cl.
*G06F 7/76* (2006.01)
*G06F 7/58* (2006.01)

(52) U.S. Cl.
CPC ............... *G06F 7/76* (2013.01); *G06F 7/588* (2013.01)

(58) Field of Classification Search
CPC .................................. G06F 7/76; G06F 7/588
USPC .......................................................... 708/200
See application file for complete search history.

(56) References Cited

U.S. PATENT DOCUMENTS

| | | | |
|---|---|---|---|
| 10,255,323 B1* | 4/2019 | Guo | G06F 16/2237 |
| 2002/0124033 A1* | 9/2002 | Takahashi | G06F 7/58 |
| | | | 708/250 |
| 2011/0041180 A1* | 2/2011 | Jakobsson | G06F 21/56 |
| | | | 726/23 |

* cited by examiner

*Primary Examiner* — Tan V Mai
(74) *Attorney, Agent, or Firm* — Plager Schack LLP; Mark H. Plager; Alexis J. Saenz

(57) ABSTRACT

Systems and methods generate a string based random permutation (SBRP). The SBRP may be used for any application which uses permutations to generate values for security or randomness. The SBRP may operate one directionally so that resulting permutation vectors cannot be reverse engineered to obtain the underlying algorithm. An exemplary embodiment uses remove and replace sub-processes which identify duplicate values in a vector. The identified values are changed to another value that is not within the vector range of values. Then, the same elements are given a new value within the vector range of values that does not already exist among the vector elements in the vector.

7 Claims, 6 Drawing Sheets

METHOD AND SYSTEM GENERATING STRING BASED RANDOM PERMUTATION

CROSS-REFERENCE TO RELATED APPLICATIONS

None.

BACKGROUND

The embodiments herein relate generally to random value generation processes and more particularly to a method and system generating string based random permutations.

Random value generation is used in a variety of fields including cryptography and electronic gaming.

It is known in the field of cryptography and security systems to use algorithms using permutations to generate strings of values to develop encryption schemes. However existing methods cannot guarantee yielding the same permutation each time needed and for this reason many encryption systems and other permutation-based systems use a predefined/fixed permutation. In addition, some current methods can be reverse engineered leading to security flaws.

In the field of electronic gaming, the algorithms used to generate random values are critical to preserving the integrity of the game and to avoid exploitation that corrupts the outcome of games.

Embodiments of the subject technology solve these problems.

SUMMARY

In one aspect, a computer program product for generating a random permutation vector of length N, comprises a non-transitory computer readable storage medium having computer readable program code embodied therewith. The computer readable program code is configured to: receive an input string of input elements; extract each input element from the input string; save each extracted input element into a vector comprising vector elements; calculate a value from 1 to N for each vector element in the vector, wherein N is a non-negative number; identify duplicate values among the vector elements; except for a first instance of a duplicate value, change all duplicate values to a negative value; replace all negative values with new values within the range of 1 to N, wherein the new values do not already exist in the vector; and generate a string based random permutation (SBRP) vector from the vector including the new values for the vector elements.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Embodiments disclosed herein generally provide a system and process to generate string based random permutations that improve for example, the field of encryption systems and electronic gaming. Cybersecurity, for example, is a field that uses algorithms to encrypt information. Generally speaking, cybersecurity is subject to being infiltrated by means of hacking current encryption schemes because cyberthieves may be able to reverse engineer current encryption techniques including those using string-based permutations. Aspects of the subject technology generate a permutation vector, P of size N out of N! permutations from a given string. A string may comprise letter(s) of any language's alphabet, numeric digits, and all other special and/or control characters. As will be appreciated, some embodiments may provide a hashing method that produces the same permutation as long as the same input data is given. The goal of a hash value of the user input string and size is to uniquely generate a permutation; so, it can generate P in its entirety. As will be further appreciated, one aspect of the subject technology is that embodiments provide a one directional process; therefore, the user input string and its size cannot be recognized or regenerated from the permutation. The generated permutation is unique one for the given string and permutation size; therefore, the uniqueness of the generated permutation promotes the randomness of the outcome. These aspects differ from what currently exists since the same permutation can be generated each time when the same user input string and permutation size are used; so, the process in general may be considered a controlled and secured permutation.

Figure 1:
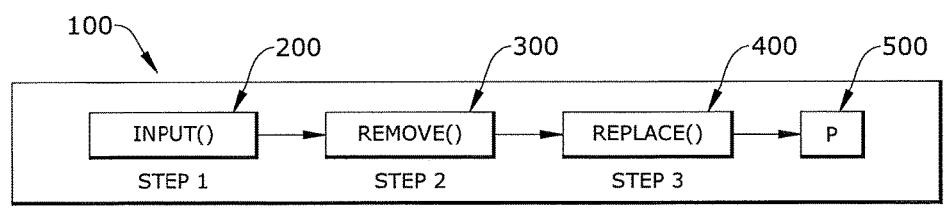
FIG. 1 is a flowchart of a method of generating a string based random permutation according to an embodiment of the subject technology.

Referring now to FIG. 1, a general process 100 for string based random permutation (SBRP) is shown according to an exemplary embodiment. In general, the SBRP process 100 includes three primary sub-processes; input 200, remove 300, and replace 400 that generate a SBRP vector P 500. As will be understood, some embodiments may include more steps or processes before, in between or after these three sub-processes and the inclusion of more steps or processes does not change the scope of protection disclosed herein. Each of these sub-processes will be described in detail below.

Figure 2:
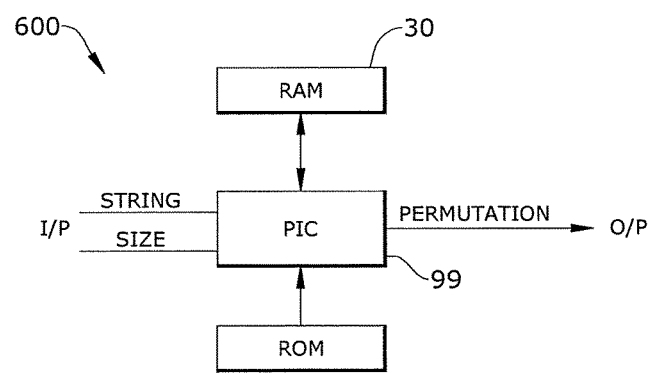
FIG. 2 is a block diagram of a system generating a string based random permutation according to an embodiment of the subject technology.

FIG. 2 shows a system 600 embodiment for generating SBRPs in an exemplary embodiment. The system 600 is generally electronic and may include for example, a Peripheral Interface Controller module (PIC) which includes or is connected to a computer processing element. The PIC may also be connected to read-only memory (ROM) which store the program (software) and random-access memory (RAM) 30 which store all variables needed when the software is executed. A user (or in some embodiments, an automated process) provides an input string and a permutation size. The PIC may process the input string and permutation size to generate a random permutation as an output of the system. The details of how the output may be generated follows.

Figure 3:
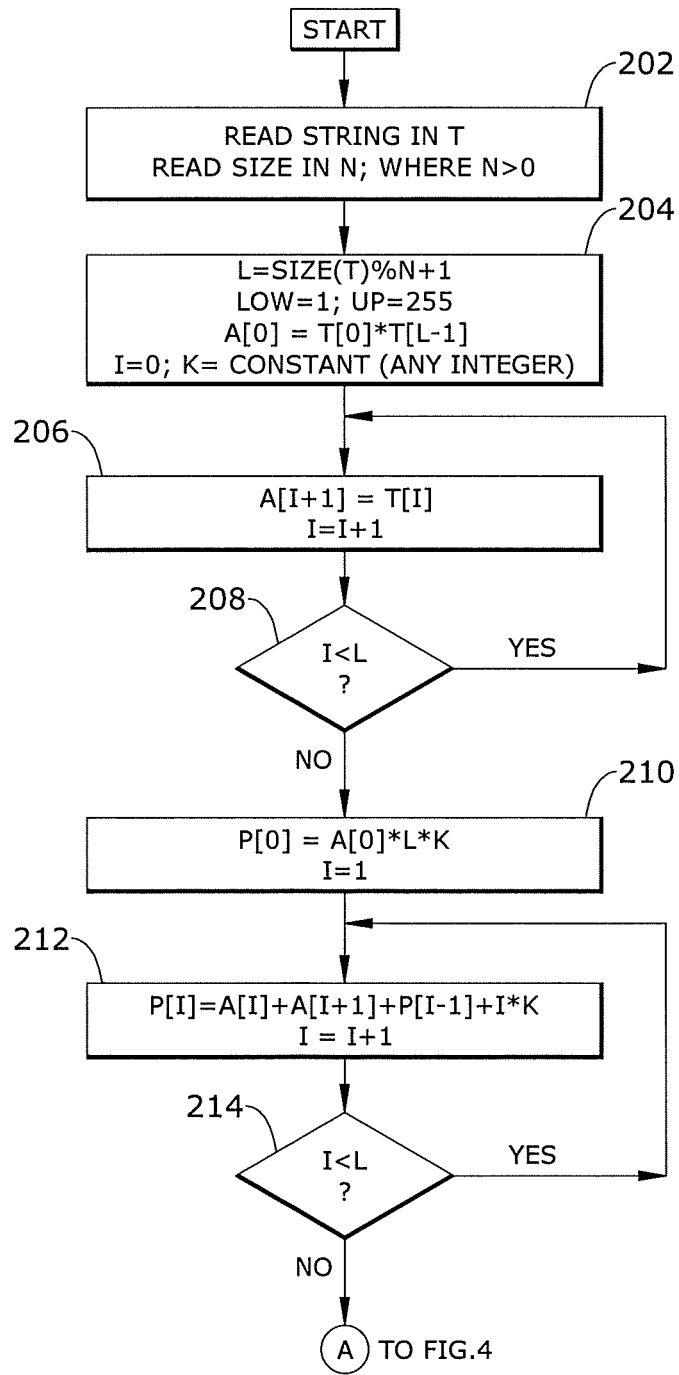
FIGS. 3 and 4 are a flowchart of a method of processing input values for generating a string based random permutation according to an embodiment of the subject technology.
Figure 4:
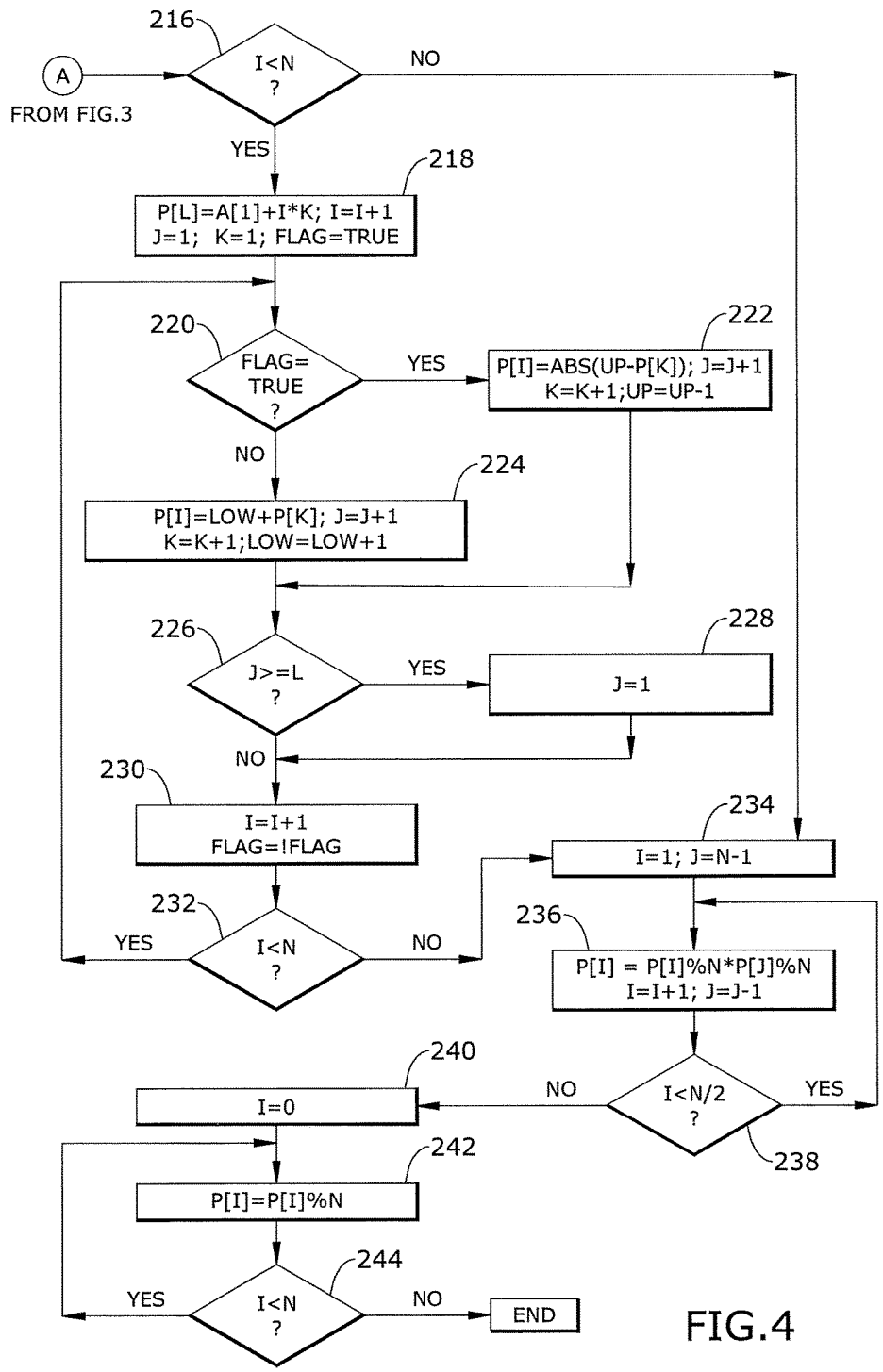

Referring now to FIGS. 3 and 4, the input process 200 is shown according to an exemplary embodiment. In block 202, the system may receive, read and store an input string T in permutation size (N) (where N is greater than zero). In block 204, the process may set an index L as the size of string T. If the index size is greater than the permutation size N, then L may be set to N. The LOW limit of the variable may be set to 1 and incremented by 1 each time its value is used. The UP (upper) limit of the variable may be set to 255 and decremented by 1 each time its value is used. K may be set as a constant variable of any positive integer. It is used later to calculate values of elements of P. In addition, the process may retrieve the value of a first element (T[0]) and a last element (T[L−1]) from input string T, multiply them and store the product in vector A at index 0. The counter I may be set to 0. In block 206, the ASCII code of each input element from string T may be extracted, read and saved in vector A. In block 208, a check of whether all elements of T have been used may be performed (I<L?). If not, the operation in block 206 may be performed again until the counter I is not less than L (in other words, whether all elements of T have been used). Then the process may proceed to block 210 which sets the value of the first element of vector P. In block 212, the remaining values of P may be set by the equation P[I]=A[I]+A[I+1]+P[I−1]+I*K (filling the vector elements by adding two successive elements of the vector in, starting from the first element in the vector until all elements are filled). In block 214, another check of whether all elements of T have been used may be performed. If not, the operation in block 212 may be repeated until all elements have been used.

In block 216, a check may be performed to see whether vector P has values that remain to be filled. If the vector P has all values filled, then the process may jump to block 234. If values remain in vector P, then in block 218, the value of P at index L may be set according to the equation $$P[L]=A[1]+1*K;\ I=I+1;\ J=1;\ K=1;\ FLAG=TRUE,$$

where FLAG is a variable of two values: true and false.

In block 220, depending on whether FLAG=TRUE, then the process may fill all remaining values in P according to equations in 222 or 224 with respect to value in FLAG.

In block 226, the process may check whether all elements of T are used and P is still not full (is J greater than the size of T). If J is greater than the size of T, then J may be set to 1 in block 228. If not, then in block 230, I may be incremented by 1 and the value of FLAG may be changed. In block 232, the process may check whether I exceeds the size of P. If it does, then the process may return to block 220. If not, then in block 234, I may be set to 1 and J may be set to N−1. In block 236, values of P may be changed from the first element up to the middle element of P according to the equation:

$$P[I]=P[I]\%\ N*P[J]\%\ N,$$

where I=I+1; J=J−1.

In block 238, the process may check whether I<N/2. This changes the first half values of P[I] in order to reduce the probability of having similar values. If yes, then the process at block 236 may repeat until the determination in block 238 is not true. In block 240, I may be set to 0. In block 242, all values in P may be set within the range 0 to N−1. In block 244, the process may run until the counter I is not less than the permutation size N, otherwise the process may repeat the operation in block 242 until I<N.

Figure 5:
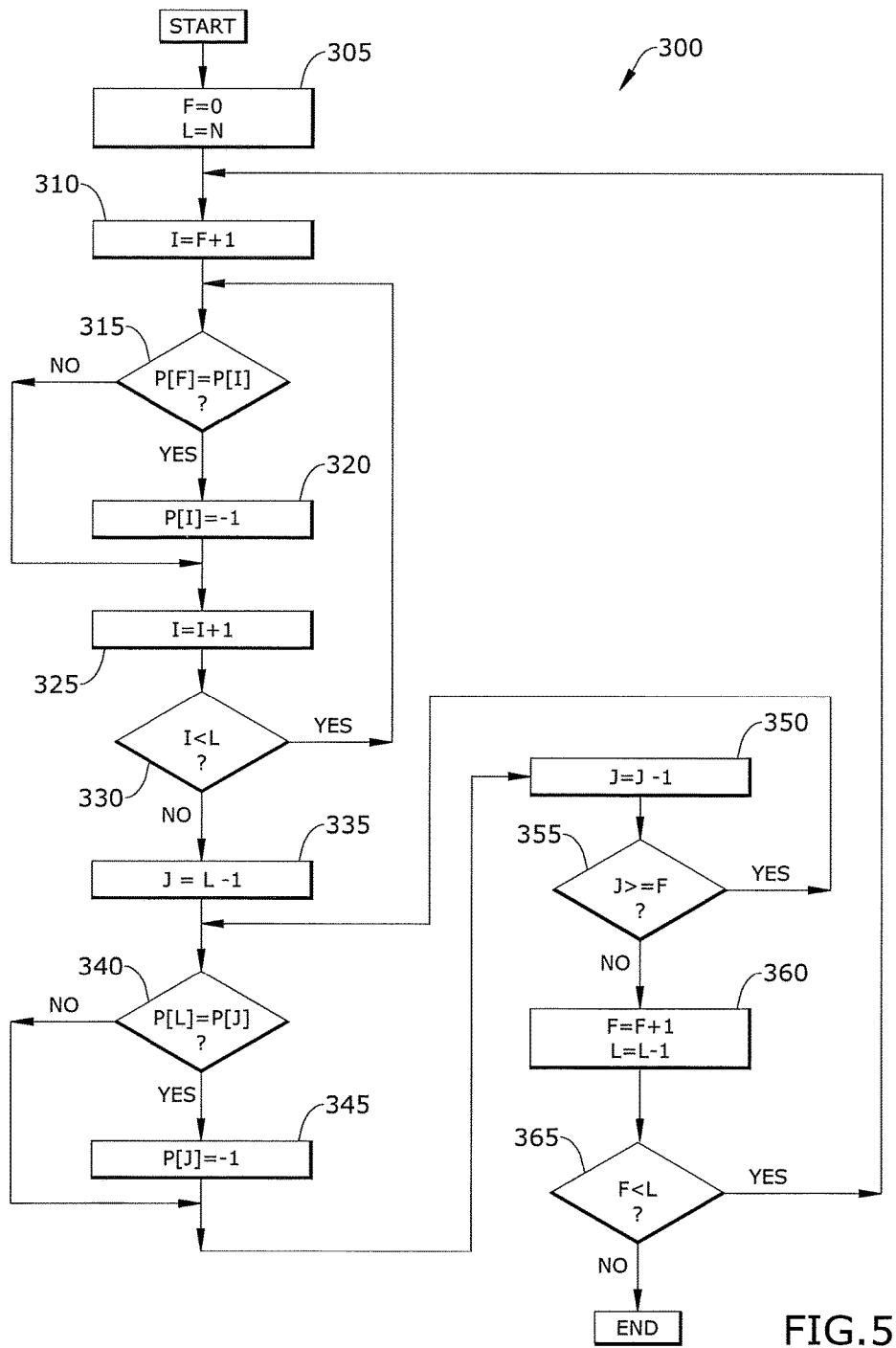
FIG. 5 is a flowchart of a remove process for generating a string based random permutation according to an embodiment of the subject technology.

Referring now to FIG. 5, the remove process 300 is shown according to an exemplary embodiment. In block 305, the process may set, F=0, where F is the index of the first element in P. F may be used to scan from the left side to the right side of P. Also, L may be set to N, where L is the index of the last element in P. L may be used to scan from the right side to the left side of P. The purpose of this process is to set one value to −1 to check whether a duplicate value occurs when scanning P from the left end. Then the process may switch directions to check whether a duplicate occurs when scanning P from the right end, and then switch back to scan P from the left end and so on.

In block 310, the counter I may be set to =F+1. In block 315, the process may determine whether there are any duplicate values in the permutation vector (is any P[F] and P[I] the same?). If not, the process may jump to block 325. If duplicate values exist, in block 320, any duplicate value in P may be set to negative one (−1). In block 325, the counter I may be incremented for each element/value checked. In block 330, the process may determine whether the counter I reaches the end of P. If so, the process may return to block 315 to check if any duplicate values remain or arise. If the counter I has not reached the end of P, then in block 335 the process may set a variable J to the index of last element of P. In block 340, the process may determine whether duplicate values exist after setting the variable J to the index of the last element of P. If duplicate values exist, then in block 345, any duplicate values may be set to negative one (−1) in P.

In block 350, the variable J may be decremented by one. In block 355, the process may determine whether the variable J is less than or equal to F, the index of the first element in P. If so, then the process may repeat checking for duplicate values and so on starting from block 340. If not, then the process may in block 360, increment the first index of P by 1 and decrement the last index of P by 1 until in block 365, the index of first element of P passes the last index of the element of P.

Figure 6:
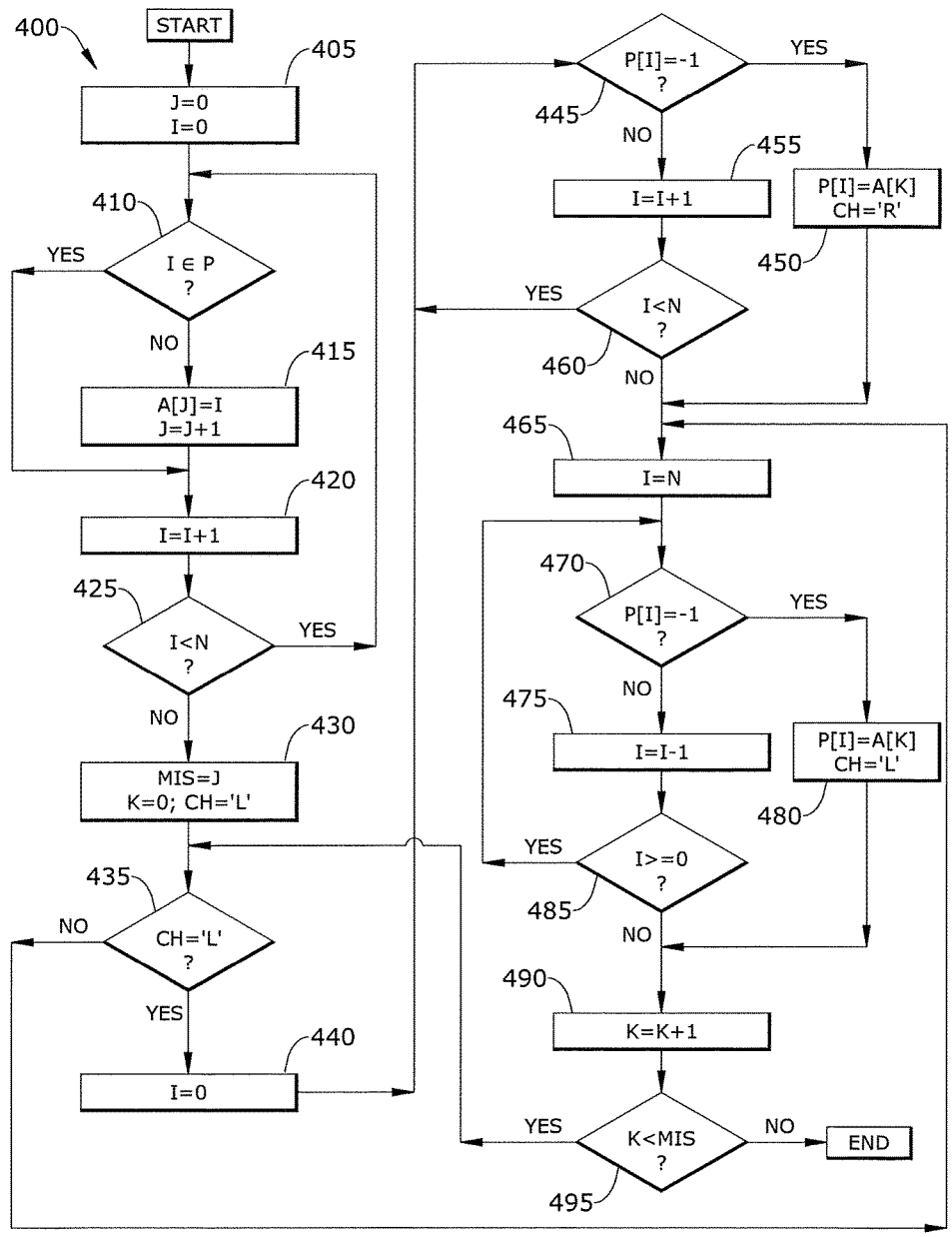
FIG. 6 is a flowchart of a replace process for generating a string based random permutation according to an embodiment of the subject technology.

Referring now to FIG. 6, the replace process 400 is shown according to an exemplary embodiment. In block 405, the process may set a variable J to 0. a variable "MIS" will store a number of missing values. Variable I may be set as a counter which may have values from 0 to N−1. In block 410, the process may check if variable I is an element in vector P. In block 415, the process may set A as a vector of size N used to add all values that do not exist in vector P. Variables I that do not exist in P may be stored in vector A. In block 420, the counter I may be incremented. In block 425, the process may determine whether counter I is less than N (the size of vector P). If so, the process may repeat from block 410. If not, the process may in block 430: store a number of missing values of P in the variable MIS; variable "CH", (which may be a variable name used to store in it a value "L" or "R" (shorthand for a character because it contains only 1 character Left(L) or Right(R))), may be set to take 2 values "L" for left side of vector P and "R" for right side of vector P, in which the step initially takes "L"; and a variable K may be set as a counter to check for the number of missing values taken. In block 435, the process may determine whether CH="L". If so, then vector P may be processed from the left side (and in block 440, the process may increment). Otherwise, vector P may be processed from the right side.

In block 445, the process may check elements for values that were set to negative one (−1). For an element whose value is negative one (−1), the process may in block 450, insert one missing value that is in A[K] in the vector P[I], replacing the negative one (−1) value. The process may also change the value CH to ="R" in order to prepare taking (−1) values in P from the right-hand side. If an element is not negative one (−1), then the process may in block 455, increment I and go to the next element in P until I is no longer less than N (block 460).

In block 465, the process may set I=N and then in block 470, the process may check the next element from the right side for values that are negative one (−1). In block 480, the process may insert one missing value that is in A[K] in the vector P[I]. The process may also change the value, CH to ="L" in order to prepare taking (−1) values in P from the left-hand side. However, if the element being checked is not a negative one value, then in block 475, the counter I may be decremented. In block 485, the process may check whether the beginning of P has been reached. If not, then the process in block 490 may use the next missing value available (one that may not be a duplicate value of another value in the vector) to replace the next negative one (−1) value until all negative one values have been replaced (determination in block 495)

Figure 7:
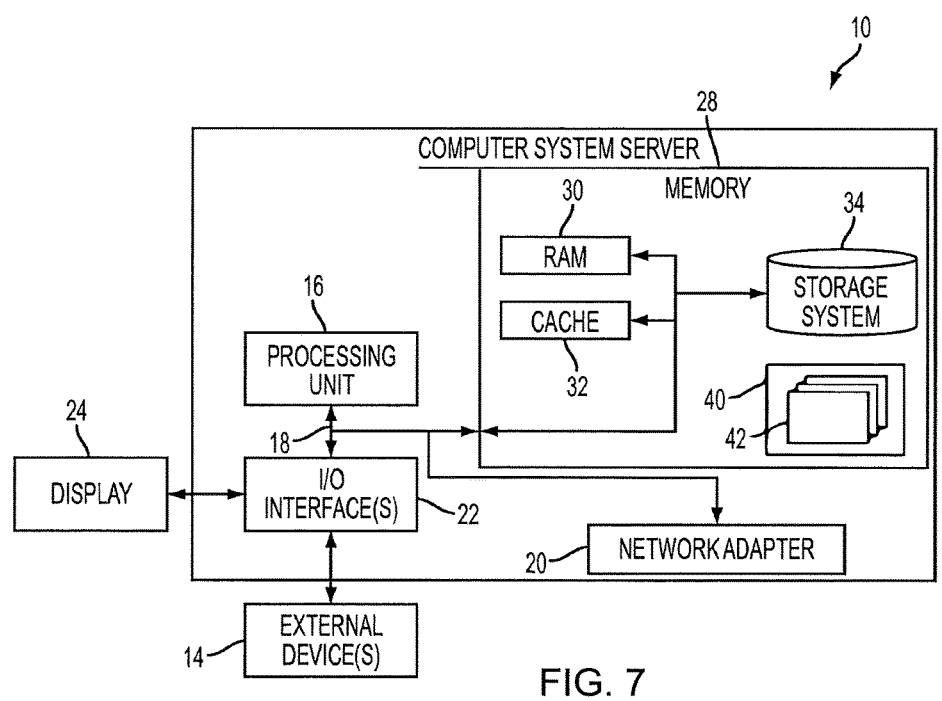
FIG. 7 is a block diagram of a computer system/server according to an embodiment of the subject technology

Referring now to FIG. 7, a schematic of an example of a computer system/server 10 is shown. The computer system/server 10 is shown in the form of a general-purpose computing device. The computer system/server 10 may serve the role as the machine implementing for example the functions of processing input, removing, and replacing described above. As will be appreciated, embodiments provided by the steps described above may transform a general computing device 10 into a special computing for the purposes of generating a SBRP. As a result, it becomes clear that the steps in the processes described above are unlikely to be performed manually and aspects of the processes disclosed above generate a SBRP by automation of the elements described in FIGS. 2-6 above and FIG. 7 herein. In addition, it will be appreciated that aspects of the embodiments disclosed solve particular problems in particular fields such as cybersecurity encryption systems and electronic gaming.

The components of the computer system/server 10 may include, but are not limited to, one or more processors or processing units 16, a system memory 28, and a bus 18 that couples various system components including the system memory 28 to the processor 16. In some embodiments, the processor 16 may be an element in the PIC 99 of FIG. 2.

The computer system/server 10 may perform functions as different machine types depending on the role in the system the function is related to. For example, depending on the function being implemented at any given time when interfacing with the system, the computer system/server 10 may be for example, personal computer systems, tablet devices, mobile telephone devices, server computer systems, handheld or laptop devices, multiprocessor systems, microprocessor-based systems, set top boxes, programmable consumer electronics, network PCs, and distributed cloud computing environments that include any of the above systems or devices, and the like. The computer system/server 10 may be described in the general context of computer system executable instructions, such as program modules, being executed by a computer system (described for example, below). In some embodiments, the computer system/server 10 may be a cloud computing node connected to a cloud computing network (not shown). The computer system/server 10 may be practiced in distributed cloud computing environments where tasks are performed by remote processing devices that are linked through a communications network. In a distributed cloud computing environment, program modules may be located in both local and remote computer system storage media including memory storage devices.

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 (also seen in FIG. 2) and/or a cache memory 32. By way of example only, a storage system 34 can be provided for reading from and writing to a non-removable, non-volatile magnetic media device typically called a "hard drive" (not shown). The system memory 28 may include at least one program product 40 having a set (e.g., at least one) of program modules 42 that are configured to carry out the functions of embodiments of the invention. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer program product for generating a random permutation vector of length N, the computer program product comprising a non-transitory computer readable storage medium having computer readable program code embodied therewith, the computer readable program code being configured to, when executed by a computer processor:

receive an input string of input elements;

extract each input element from the input string;

save each extracted input element into a vector comprising vector elements;

calculate a value from 1 to N for each vector element in the vector, wherein N is a non-negative number;

identify duplicate values among the vector elements;

except for a first instance of a duplicate value, change all duplicate values to a negative value;

replace all negative values with new values within the range of 1 to N, wherein the new values do not already exist in the vector; and generate a string based random permutation (SBRP) vector from the vector including the new values for the vector elements.

2. The computer program product of claim 1, further comprising computer readable program code configured to receive a permutation size along with the input string of input elements, and wherein the generated SBRP is based on the received permutation size.

3. The computer program product of claim 1, further comprising computer readable program code configured to extract ASCII code from each input element and wherein the step of saving each extracted input element includes saving the ASCII code of each input element into the vector.

4. The computer program product of claim 1, wherein the SBRP operates in one direction.

5. The computer program product of claim 2, wherein the SBRP produces a same permutation vector for a given input string and a given permutation size.

6. The computer program product of claim 1, further comprising computer readable program code configured to generate an authentication process using the generated SBRP.

7. The computer program product of claim 1, further comprising computer readable program code configured to generate a digital signature using the generated SBRP.

* * * * *